(12) United States Patent
Breen et al.

(10) Patent No.: US 6,213,032 B1
(45) Date of Patent: Apr. 10, 2001

(54) USE OF OIL WATER EMULSION AS A REBURN FUEL

(75) Inventors: Bernard P. Breen, Pittsburgh, PA (US); James E. Gabrielson, Hanover, MN (US)

(73) Assignee: Energy Systems Associates, Pittsburgh, PA (US)

( * ) Notice: Subject to any disclaimer, the term of this patent is extended or adjusted under 35 U.S.C. 154(b) by 0 days.

(21) Appl. No.: 09/385,992

(22) Filed: Aug. 30, 1999

(51) Int. Cl.[7] .................................................. F23J 15/00
(52) U.S. Cl. ........................ 110/345; 110/215; 110/342; 110/347; 110/203
(58) Field of Search .................................. 110/214, 215, 110/342, 345, 347, 203, 233; 431/2, 4, 5, 10

(56) References Cited

U.S. PATENT DOCUMENTS

| | | |
|---|---|---|
| 3,958,915 * | 5/1976 | Noda et al. ............................. 431/9 |
| 4,425,159 | 1/1984 | Nixon . |
| 4,597,342 | 7/1986 | Green et al. . |
| 4,785,746 | 11/1988 | Roy et al. . |
| 5,078,064 * | 1/1992 | Breen et al. ........................... 110/212 |
| 5,707,596 * | 1/1998 | Lewandowski et al. ............. 423/235 |
| 5,746,144 * | 5/1998 | Breen et al. ........................... 110/345 |
| 5,890,442 * | 4/1999 | Holmes et al. ........................ 110/345 |
| 5,992,337 * | 11/1999 | Phillipe et al. ....................... 110/348 |

* cited by examiner

Primary Examiner—Denise L. Ferensic
Assistant Examiner—Ken B. Rinehart
(74) Attorney, Agent, or Firm—Buchanan Ingersoll, P.C.

(57) ABSTRACT

An in-furnace method and apparatus reduces nitrogen oxides in flue gas by injecting an oil water emulsion into flue gas so that the oil and water mixes with said flue gas. The emulsion has from 35% to 80% water and is injected in sufficient quantities to provide enough oil to promote a reaction between the nitrogen oxides in the flue gas and the oil, so as to reduce nitrogen oxide content of the flue gas and to maintain overall fuel lean conditions above the primary combustion zone. The emulsion preferably is atomized before injection and may also be injected in jet streams. Other materials such as limestone, ammonia and urea could be added to the oil water emulsion prior to injection.

15 Claims, 2 Drawing Sheets

USE OF OIL WATER EMULSION AS A REBURN FUEL

FIELD OF THE INVENTION

The invention relates to a method of reducing $NO_x$ emissions from furnaces.

BACKGROUND OF THE INVENTION

There is a well-known procedure for reducing $NO_x$ emissions from furnaces known as reburn and by various other terms. In this procedure a fuel, usually natural gas or sometimes pulverized coal, is introduced into the furnace above the primary combustion zone. Usually more than enough fuel is added to react with all of the oxygen remaining in the original combustion products. A reducing zone, or a zone with an excess of fuel, is formed. In this reducing zone the NO reacts with the excess fuel to form $N_2$, $NH_3$, HCN, and other reduced nitrogen. Then more completion air is added to combust the remainder of the reburn fuel. At this point the $NH_3$, HCN, and other reduced forms are oxidized to $N_2$ and NO. At this step and through out the mixing process there is also a direct reaction between NO and $NH_3$ to form $N_2$. In each step, part of the fixed nitrogen (originally NO) was converted to $N_2$. This is the goal of the reburn process.

Sometimes a modified reburn process is used in which the reburn fuel is not added in sufficient qualities to consume all of the oxygen remaining in the gas after the initial combustion. In such a process it is necessary that large volumes become reducing while parallel volumes remain oxidizing. In the reducing volumes $N_2$, $NH_3$, and HCN are formed. Then the reducing and oxidizing gases mix together and the remainder of the fuel is consumed. At this point the reduced nitrogen species are oxidized to $N_2$ and NO. Again there is direct reduction to $N_2$ by the reaction between $NH_3$ and NO. This modified or fuel lean process is simplified by the lack of need for completion air and by requiring less reburn fuel and also less reburn fuel mixing with associated furnace volume requirements.

Another version of the reburn process is to inject a gas as the reburn fuel into the flue gas stream. This process usually requires natural gas as the reburn fuel. Natural gas is expensive. Although natural gas alone has been injected as a reburn fuel, often it is necessary to use a carrier gas to assure adequate penetration of the natural gas into the furnace. If the reburn natural gas is 5% of the fuel and the fuel is only 10% of the air flow, the reburn gas is perhaps only 0.5% of the flue gas flow. The combustion products being quite hot may have a volume as high as 1000 times the reburn fuel. Utility boiler furnaces have horizontal dimensions of 50 feet and greater. Penetration and mixing is a great problem.

In those processes where a carrier gas is used the carrier gas may be steam, air, or combustion products. The steam is expensive. The use of air or recycled combustion products requires expensive duct work. Often there is no place for the duct work. The boiler face is simply too crowded with necessary equipment to allow the duct work to be installed. When a carrier gas is used large penetrations through the furnace walls are needed and this requires bending water wall tubes. If flue gas is used as the carrier, extensive duct work is usually required because the flue gas must be returned from a remote part of the boiler. Fans are needed for flue gas and often for air. The air has oxygen in it, which requires more reburn fuel before the gas stream can be made reducing.

Some operators have tried coal as a reburn fuel. The burnout times are longer. This requires that both the fuel and the burn out air be added sooner. As a result much of the reaction occurs at higher temperatures, which results in more $NO_x$ emissions. The use of coal requires that there be additional pipes to carry primary air and pulverized fuel from the mills usually at ground level to the height where the reburn fuel is injected. It may even require an additional pulverizer.

We have experimented with the use of coal water slurry and have used it in the manner of fuel lean gas reburn. That is, not enough fuel was injected into the upper furnace to make the total flow fuel rich and no burn out air was added. The coal water slurry was used in a Fuel Lean Reburn System. This method is described in U.S. Pat. No. 5,746,144, issued May 5, 1998 to by B. P. Breen, J. E. Gabrielson and J. Cavello for "Method And Apparatus For $NO_x$ Reduction By Upper Furnace Injection Of Coal Water Slurry", While all of these reburn methods have been successful in reducing $NO_x$ emissions, the industry has been slow to adopt them. For many the associated costs and installation problems discussed above when considered with the expected level of $NO_x$ emissions reduction has not been perceived to be worth the investment. Consequently, there continues to be a need for a reburn method which provides significant $NO_x$ emissions reduction without requiring extensive duct work or significant modifications to the wall of the furnace.

SUMMARY OF THE INVENTION

We provide a method an apparatus for reducing $NO_x$ emissions in which an emulsion of oil and water is injected into the flue gas. The emulsion is injected in a manner to create oil droplets that are small enough so that most of them are not broken or coalesced when the emulsion passes through the atomizer into the furnace. We prefer to inject the emulsion into a region of the furnace in which the flue gas temperature is between 1800° and 2700° F. The emulsion should contain 35% to 80% water by weight. If desired limestone may be added to the emulsion to reduce $SO_x$ emissions. One could also inject reduced nitrogen sources such as ammonia or urea.

We prefer to use high shear devices with the injectors. We also prefer to provide injectors that are not in a fixed position but which can be adjusted to cover regions of the furnace that are upstream or downstream of the injector.

Other objects and advantages of the invention will become apparent from a description of certain present preferred embodiments shown in the drawing.

DESCRIPTION OF THE PREFERRED EMBODIMENTS

Figure 1:
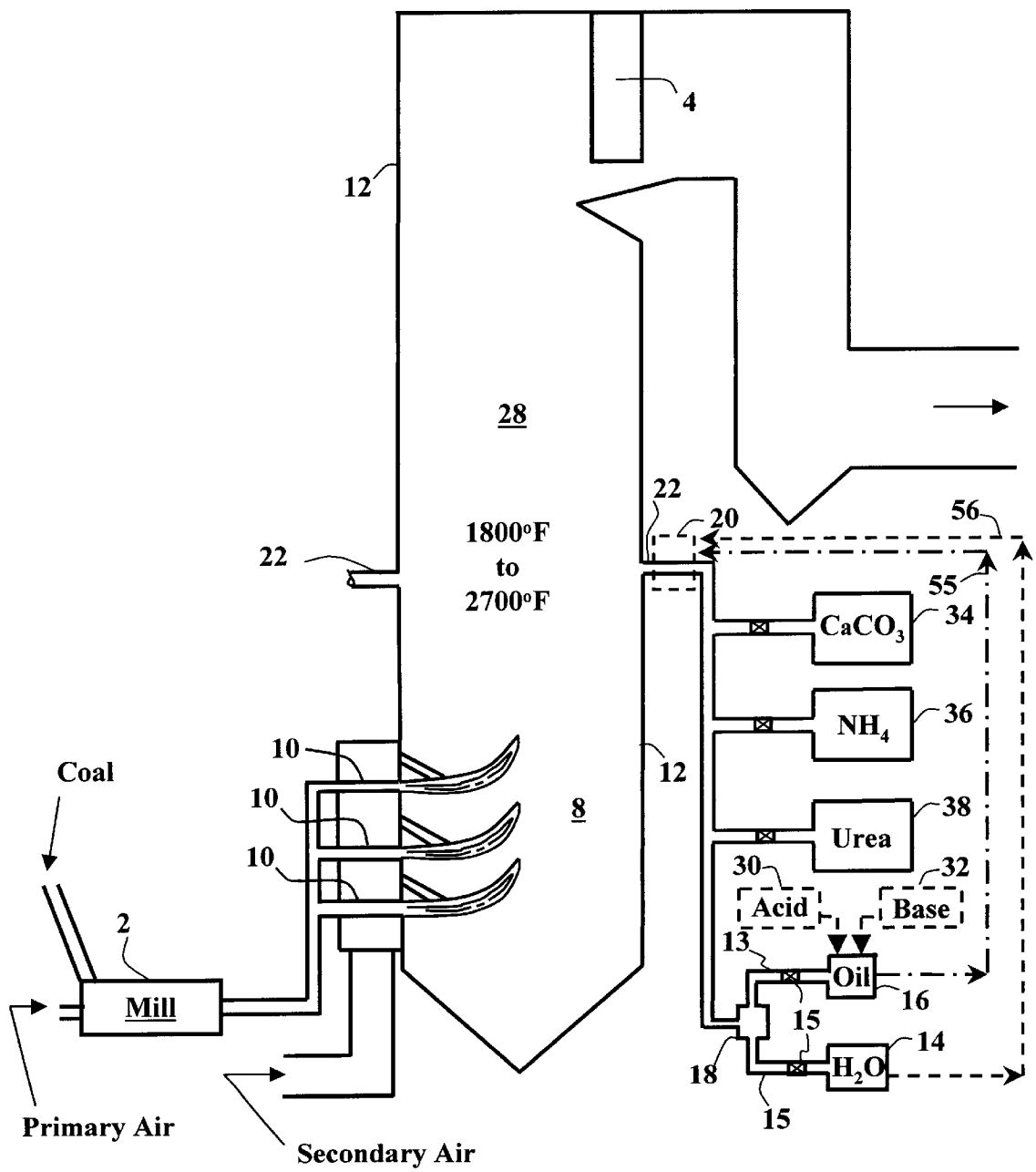
FIG. 1 is a diagram of a furnace to which injectors have been added in accordance with the present invention.

Referring to the FIG. 1 coal or other fuel is burned in a furnace or a boiler 1. Most often the coal is pulverized to about 60–80% through a 200 mesh screen. The pulverized coal is conveyed from a mill 2 to the furnace 1 in an air stream. The air stream typically supplies about 15% of the combustion air. The stream of pulverized coal is injected into a primary combustion zone 8 through burners 10 that also introduce the balance of the combustion air, usually with an excess in air of 10–35%. The coal burns and releases heat, much of which may be absorbed into water flowing in tubes along the walls 12 which form the enclosure of the furnace 1. The flue gas typically then passes through convective heat exchangers 4 and exits the furnace. In oil fired furnaces oil is atomized and injected through burners into the furnace rather than pulverized coal. The oil is burned with air flowing around the spray of oil drops. Although the FIG. 1 illustrates a coal fired furnace, it should be understood that the methods and apparatus described here apply to coal, oil or natural gas fired furnaces. Furthermore, the invention is not limited to bottom fired furnaces such as is illustrated in FIG. 1 but can also be used in face fired furnaces, opposed fired furnaces, tangentially fired boilers, cyclones and other types of furnaces to reduce $NO_x$ emissions.

Coal usually contains about 1% fixed nitrogen. During the combustion process 15% to 35% of this nitrogen is converted to NO. Oil usually has a lower concentration of fixed nitrogen but a larger percentage of the fixed nitrogen is converted to NO. In addition a very small fraction of the nitrogen in the combustion air is converted to NO. Our process is designed to convert much of this NO to the harmless $N_2$.

We produce an oil in water emulsion by providing high shear to the two fluids. As shown in FIG. 1 water from supply 14 is combined with oil from tank 16 using a mixer 18. Control valves 17 are provided in the water line 15 and the oil line 13 for changing the ratio of water to oil in the emulsion. At times we will use a high energy mixer in a tank. We may provide a high shear inline device 20, shown in dotted line, to emulsify the oil in the water. The emulsion is sometimes formed by feeding both liquids through optional conduits 55 and 56 into a pump 20 that has high enough shear to produce the emulsion. Since it is desirable to have high percentage water (35% to 80%) this high shear pump may be located immediately before the injection nozzle 22. The injection nozzle may introduce the oil water emulsion in a stream or atomized into small droplets. In the embodiment shown in FIG. 2 we provide both atomizing injectors and injectors that introduce a jet stream. The injectors are located on the furnace wall in a region 28 above the primary combustion zone where the flue gas temperature is between 1800° F. and 2700° F.

We produce an emulsion in which the oil droplets are small enough so that most of them are not broken or coalesced when the emulsion passes through the atomizer 22 into the furnace. Thus, each oil droplet remains surrounded by water when it emerges into the upper furnace environment 28. Some burner atomizers produce oil drops with sizes as low as 40 micrometers. To accommodate such atomization we produce emulsified oil drops in the range of 20 micrometers.

At times we use emulsifiers to produce the desired emulsion without putting excessive work into the emulsification process. We may add an acid or a base, indicated by dotted line boxes 30 and 32, to the oil to produce an emulsifying agent in situ from compounds in the oil and the acid or base.

To reduce the NO we inject an emulsion of oil in water into the furnace above the top row of burners. We design our process to allow the oil to react with the oxygen in the combustion products and to burn out almost completely. The emulsion is designed and produced so the water is the continuous phase and the oil is dispersed in the water as very small drops. In this manner the evaporation of the oil and the combustion of the oil is delayed while the water evaporates first. At the same time we introduce the oil so the nitrogen reactions will be at the lowest possible temperature that will allow the lowest emissions.

The water will reduce even further the reaction temperature, which will improve the $NO_x$ removal. This water also improves the kinetics of the oxidation of CO, which allows the process to operate at lower temperatures. The ratio of water to oil can be changed to further modify the very local temperature of the rebur. If the temperature is a bit too high for reburn, for $CaCO_3$ calcination, or for effective use of ammonia, more water can be added. Water/oil ratio changes can be made for final temperature trim and to adjust the location of the reburn.

The upper furnace location of the injection and the cooling of the ensuing flames by the presence of the water provide a low temperature environment, which is conducive to burning limestone to lime in a manner that causes the lime to be reactive. It is well known that lime ($CaCO_3$) is sometimes injected directly into furnaces where it is calcined to lime (CaO) which subsequently reacts with the sulfur dioxide ($SO_2$) and oxygen in the gas to form calcium sulfate ($CaSO_4$) and thus the $SO_2$ emissions are reduced. Temperatures of 2000° F. to 2400° F. are needed to calcine limestone in the short time available in the furnace. Yet, temperatures as low as 2600° F. can dead burn the lime. When the lime is dead burned it has less surface area and it only poorly reacts with the $SO_2$. To avoid this problem we prefer to provide a lime supply 34 which can be injected into our oil water emulsion. We prefer to add limestone to the flue gas so that the moles of limestone is equal to 0.25 to 2.5 times the $SO_2$ in the flue gas. By adding limestone to our oil water emulsion where we control the reaction temperature and availability of oxygen, we are able to effectively calcine the limestone without dead burning the resulting lime and thus we produce a reactive product. Being injected with the oil and water emulsion, this reactive lime is in the correct place to remove the $SO_2$ from the flue gas.

We also prefer to provide supplies of ammonia 36 and urea 38 which can be added to the oil and water emulsion. We at times add ammonia or urea to our oil water emulsion. The ammonia and the urea are very soluble in the water phase and will evaporate with the water. These agents will improve the NO reduction by reacting directly with the NO to form $N_2$. This is the reaction of selective non catalytic reduction of NO and is the reaction that is useful in reburn processes. In reburn processes the fuel rich section produces $NH_3$ and HCN from some of the NO and these species react with more of the NO to form $N_2$. This addition of $NH_3$ or urea increases these reactions if the injected materials do not become air rich until the temperatures are lowered to the appropriate level. At times these materials can double the $NO_x$ reduction of reburn.

Figure 2:
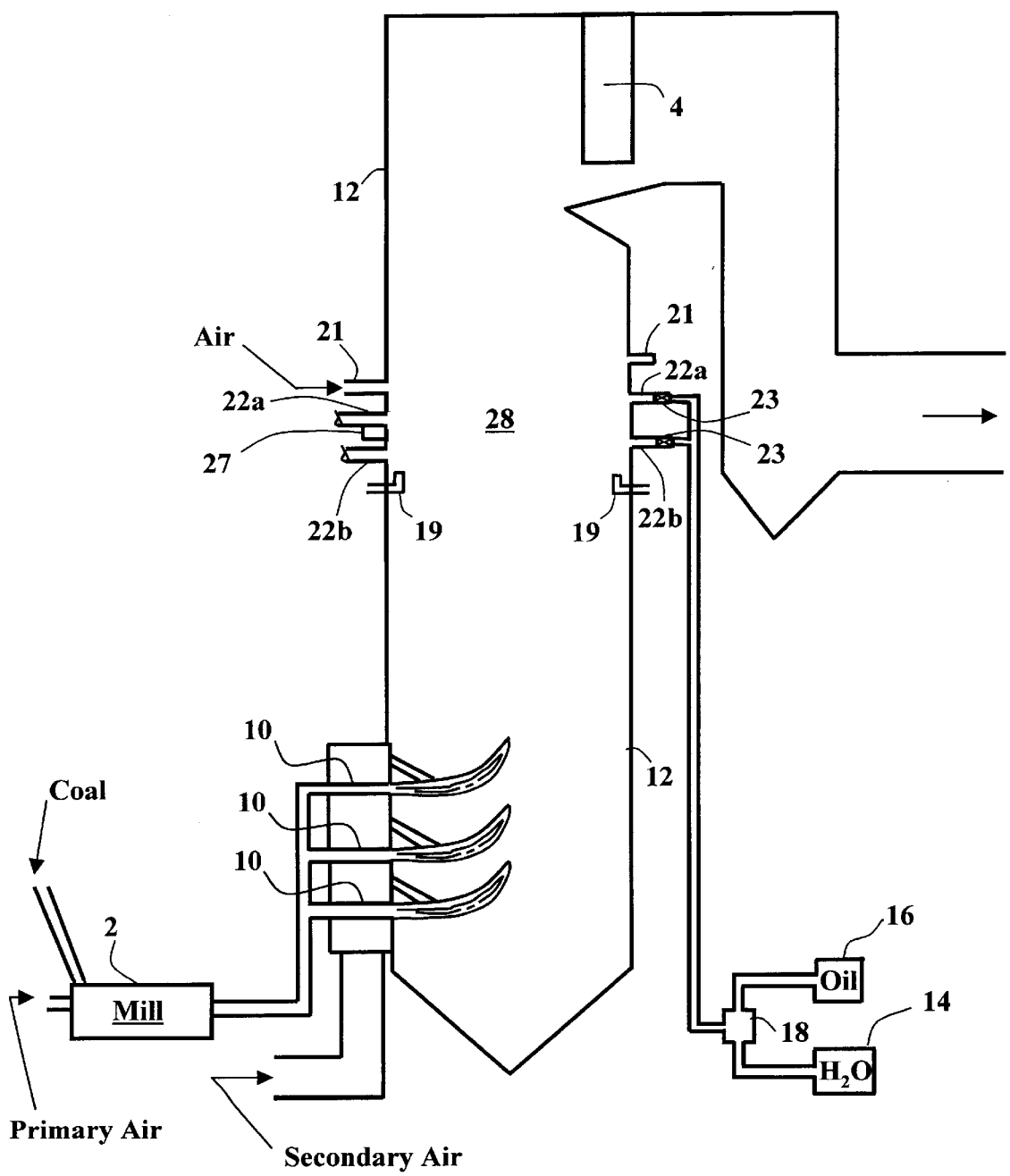
FIG. 2 is a diagram similar to FIG. 1 showing another embodiment of our apparatus.

In a second preferred embodiment shown in FIG. 2 the injectors do not all lie in a common plane. Some of the injectors 22a are positioned above other injectors 22b. Furthermore, some injectors 22a introduce jet streams while the other injectors 22b contain atomizers that cause those injectors to introduce droplets of the oil water emulsion. At least one of the injectors has a motor 27 or other device for changing the direction of the injector. This allows us to direct the stream or droplets toward any selected point within the region 25 into which the oil water emulsion is injected. Those injectors that introduce jet streams can be used to increase mixing of the oil water emulsion with the flue gas and allow greater penetration of the stream into the furnace. A valve 23 may be provided on the injector to change the flow of the emulsion through the injector. This valve and the motor could be operated from a controller (not shown) at a remote location. We further prefer to provide air inputs 21 which provide completion air or burn out air to the flue gas near the injectors. An igniter 19 can be provided near some or all of the injectors 22. The igniter causes some of the oil in the emulsion to begin burning as the emulsion enters the furnace.

The oil water emulsion is preferably introduced through atomizing nozzles, which can handle the emulsion with out breaking it down, and through jets for maximum penetration. Different size jets and atomized drops can be used depending upon the requirements of the specific furnace. We wish to cover the total furnace area 28 with oil water emulsion in the cases where we use burn out or completion air. In the case where no burn out air is used we wish to cover the volumes to be made reducing very completely without mixing any of the emulsion into the part which is to remain oxidizing.

In the case where no burn out air is used and a face fired or opposed fired unit is being used it is best to establish alternate lanes of reducing mixtures, by injecting oil-water emulsion into lanes and maintaining oxidizing lanes between the injection lanes. The relative width of the lanes would depend upon the amount of oxygen in the initial combustion products, the final amount of oxygen, and how much surplus fuel is to be in the reducing lanes. The absolute widths will be sufficient to allow almost complete volatilization and combustion of the oil in the reducing region.

In a tangentially fired boiler it is best to introduce streams of emulsion one above the other in each corner of the furnace. Atomized streams may be introduced with the jets to assure complete coverage. The coverage zones are from 4 to 12 feet high. It is not always necessary to introduce the emulsion at every corner. The same general arrangement of oil-water emulsion injection would be used with and without completion air.

Cyclone furnaces can be treated in the furnace after the gas has exited the cyclones. A lane type arrangement is best unless completion air is used.

While the $NO_x$ which is removed from flue gas by reburn is often seen as the reduction of NO to $N_2$ by fuel or the conversion of $NH_3$ or HCN to $N_2$, some of the removal is the result of NO reacting with $NH_3$ or HCN to form $N_2$. The $NH_3$ or HCN usually is formed from NO by reduction by fuel. The reaction eliminates two fixed nitrogen atoms. This is very useful. Sometimes a reduced nitrogen will be added to react with NO. This is the case in the well known selective non-catalytic reduction of $NO_x$ (SNCR) where ammonia ($NH_3$) or urea is injected in the gas at about 1800° F. The reagent reacts with the NO to form $N_2$. In some cases ammonia is added with natural gas to amplify the $NO_x$ reduction of a reburn process.

We recognize that the oil has fixed nitrogen in it and that as the reburn oil is combusted some of the nitrogen liberated from the reburn emulsified oil will react with NO to form $N_2$. This will be more predominant if most of the reburn fuel is burned with less than the stoichiometric air for complete combustion. The final burnout will be possible only if there is enough air for complete combustion. Since the total NO, both thermal $NO_x$ and fulel bound nitrogen $NO_x$ will be only 10 to 30% of the nitrogen in the primary fuel, a small amount of reburn oil say 10%, can supply enough fixed nitrogen to eliminate 33% of the NO by this mechanism alone. However, this nitrogen is not very effective at reducing $NO_x$ at the temperatures of reburn. Reburn temperatures are too high for best use of $NH_3$ or urea to reduce NO.

To overcome this problem, some more reduced nitrogen can be added to the oil water emulsion by adding a reduced fixed nitrogen compound. Urea or ammonia can be added to the coal water emulsion to act as a selective reducing agent to reduce NO. We prefer to add this fixed reduced nitrogen compound in an amount so that the atoms of reduced nitrogen are in the range of 0.24 to 6 times the atoms of NO in the primary combustion products. The temperature is high enough that we need not worry about slip. The $NH_3$ or urea that does not react with the NO will be decomposed. At the same time, the reducing conditions will keep the decomposing oil from forming NO. Both urea and ammonia are readily soluble in water and can easily be added to the emulsion and in amounts beyond the stoichiometric ratio with the NO. The excess will form $N_2$ in the reducing conditions at these temperatures, which are several hundred degrees above the optimum SNCR temperature.

The addition of water provides several beneficial effects in combustion. The water in the emulsion will increase the acid dew point of the flue gas and cause more $SO_3$ to condense on the fly ash as sulfuric acid. The result will be a better performing electrostatic precipitator in cases where the primary fuel is coal. The water in the emulsion, beside being an effective carrier and providing for atomization, also aids oil combustion through the well-known carbon-water gasification reaction. By properly adjusting the water content of the emulsion to between 40% and 80%, the hydrocarbon in the oil can be thus gasified with the carbon-water gasification reaction without producing undue smoke. The reducing jet conditions would form smoke without this gasification reaction. Therefore, our oil in water emulsion is adjusted to between 35% water by weight to as high as 80% water. Usually in a reburn process the percent water is minimized but in this upper furnace application it is important to have higher percent water for this gasification reaction.

In general it is better to operate reburn fuel at temperatures that are as low as possible. This increases the $NO_x$ reduction potential directly in proportion to the decrease in equilibrium $NO_x$ as the temperature decreases. However, in the case of oil water emulsion where the fuel is very economical it is possible to overcome this temperature limitation by using more reburn fuel. If completion air is used, it is necessary to use a great amount of completion air if a great amount of oil-water emulsion is used as reburn fuel. If no completion air is used and a great amount of reburn emulsion is used it is only necessary to assure that the lower furnace is sufficiently air rich to supply the oxygen for bum out.

Our reburn temperature window is much wider than other reburn temperature windows where it is only economical to reburn with 2% to 12% of the total fuel. In our case, where the oil water emulsion is at most a little more expensive than the base fuel we can reburn with 25% of the fuel and do so at very high temperature while achieving large $NO_x$ reductions. In some case the oil water emulsion can be made from materials that may even be cheaper than the base fuel.

Our temperature window is 1800° F to 2700° F. The emulsion is from 40 to 80% water and adjustments can be made to accommodate different furnaces or furnace conditions. The emulsion is introduced both as streams (jet) and spray of drops, usually in combination to assure better coverage.

We do not require carrier air, steam, nor flue gas. We can design systems with and without burn out air. We do not require the elaborate duct work of other reburn processes. We do not require the expensive natural gas.

Although we have described and shown certain present preferred embodiments of our method and apparatus it should be distinctly understood that our invention is not limited thereto but may be variously embodied within the scope of the following claims.

We claim:

1. An in-furnace method of reducing nitrogen oxides in flue gas produced when a fuel is burned in a primary combustion zone comprising the step of injecting an oil water emulsion into flue gas so that the oil and water mixes with said flue gas, the oil being in sufficient quantity to promote a reaction between said nitrogen oxide in the flue gas and said oil, so as to substantially reduce nitrogen oxide content of the flue gas and to maintain overall fuel lean conditions above the primary combustion zone.

2. The method of claim 1 also comprising adding burnout air to the flue gas.

3. The method of claim 1 wherein the oil water emulsion is injected into flue gas that is at a temperature in the range of 1800° F to 2700° F.

4. The method of claim 1 also comprising introducing combustion air at a location where the oil water emulsion is injected.

5. The method of claim 1 also comprising adding limestone to the oil water emulsion.

6. The method of claim 5 wherein the limestone is added so that the moles limestone is equal to 0.25 to 2.5 times the $SO_2$ in the flue gas.

7. The method of claim 1 also comprising adding a fixed reduced nitrogen compound to the emulsion.

8. The method of claim 7 wherein the furnace burns a fuel to create primary combustion products containing NO and the fixed reduced nitrogen compound is added so that the atoms of reduced nitrogen are in the range of 0.25 to 6 times the atoms of NO in the primary combustion products.

9. The method of claim 7 wherein the fixed reduced nitrogen compound is selected from the group consisting of ammonia and urea.

10. The method of claim 1 also comprising changing the ratio of water to oil in the oil water emulsion to change the reburn temperature.

11. The method of claim 5 wherein the flue gas has a calcination temperature also comprising increasing the water to oil ratio in the oil water emulsion to lower the calcination temperature.

12. The method of claim 7 also comprising changing the water to oil ratio in the oil water emulsion to improve usage of the fixed nitrogen compound.

13. The method of claim 1 also comprising changing the ratio of water to oil ratio within the range of 30% to 80% water in the emulsion.

14. The method of claim 1 wherein the furnace has a total fuel comprised of that fuel injected into the primary combustion zone and the oil injected in the oil water emulsion also comprising adjusting the oil water emulsion so that the oil supplies ½ % to 35% of the total fuel when the oil water emulsion contains 35% to 80% water by weight.

15. The method of claim 1 also comprising further emulsifying the oil water emulsion near the injectors.

* * * * *